(12) United States Patent
Hirai et al.

(10) Patent No.: US 7,699,370 B2
(45) Date of Patent: Apr. 20, 2010

(54) REAR CONSOLE BOX

(75) Inventors: Shinji Hirai, Kariya (JP); Masashi Tsujikawa, Kariya (JP)

(73) Assignee: Toyota Boshoku Kabushiki Kaisha, Aichi (JP)

( * ) Notice: Subject to any disclaimer, the term of this patent is extended or adjusted under 35 U.S.C. 154(b) by 0 days.

(21) Appl. No.: 12/254,186

(22) Filed: Oct. 20, 2008

(65) Prior Publication Data

US 2009/0108609 A1   Apr. 30, 2009

(30) Foreign Application Priority Data

Oct. 26, 2007   (JP) .............................. 2007-279454

(51) Int. Cl.
   *B60R 7/04*   (2006.01)
(52) U.S. Cl. .................................. 296/24.34
(58) Field of Classification Search ............... 296/37.1, 296/37.8, 37.15, 37.16, 63, 64, 24.3, 24.34; 224/275, 282, 484, 311, 321; 297/411.2, 297/411.21, 411.3, 411.32, 411.35, 112, 297/113, 115
See application file for complete search history.

(56) References Cited

U.S. PATENT DOCUMENTS 3,356,409 A * 12/1967 Belsky et al. ............ 296/24.34
4,733,901 A    3/1988 Okuyama
4,809,897 A *  3/1989 Wright, Jr. ................... 224/282
5,671,686 A *  9/1997 Hurley et al. ................. 108/45
7,413,229 B2 * 8/2008 Kukucka et al. ......... 296/24.34
2006/0097532 A1 * 5/2006 Adams et al. ............ 296/24.34
2007/0152461 A1 * 7/2007 Joler et al. ............... 296/24.34
2008/0100103 A1 * 5/2008 Kim ...................... 297/188.19
2008/0156561 A1 * 7/2008 Yano et al. .................. 180/219
2008/0315606 A1 * 12/2008 Sturt et al. ............... 296/24.34

FOREIGN PATENT DOCUMENTS

JP    61-175055 U    10/1986

* cited by examiner

*Primary Examiner*—H Gutman
(74) *Attorney, Agent, or Firm*—Greenblum & Bernstein, P.C.

(57) ABSTRACT

A rear console box in accordance with the present invention is for a vehicle. The vehicle includes a floor, seat rows on the floor, and an aisle between the seat rows. The rear console box is disposed in the aisle. The rear console box includes a console box body, a hinge configured to connect the console box body with respect to the floor and thereby allow the console box body to pivot between a horizontal position and a raised position. The horizontal position is in the aisle and is substantially horizontal relative to the floor. The raised position is outside the aisle and in front of the aisle. The rear console box also includes a support member configured to extend between the console box body and the floor. The support member supports the console box body and thereby holds the raised position of the console box body.

3 Claims, 14 Drawing Sheets

[FRONT SIDE OF VEHICLE]   [REAR SIDE OF VEHICLE]

REAR CONSOLE BOX

CROSS REFERENCE TO RELATED APPLICATION

This application claims priority from Japanese Patent Application No. 2007-279454 filed on Oct. 26, 2007. The entire content of this priority application is incorporated herein by reference.

TECHNICAL FIELD

The present invention relates to a rear console box.

BACKGROUND OF THE INVENTION

A known vehicle has a rear console box disposed in an interior floor and in an aisle between seat rows. Such a rear console box is used as a storage space for, for example, small articles. Since the rear console box is disposed in the aisle, the rear console box may obstruct, for example, movement of a passenger in the aisle. One of solving means for the problem is to raise the rear console box toward the front of the vehicle and thereby open the space in the aisle. An art similar to this type of the rear console box is disclosed in Japanese Unexamined Utility Model Application Publication No. 61-175055. In the art, an armrest is raised toward the front of the vehicle to make a space in the center of the vehicle.

In the art, a stopper belt of the armrest is hung on a ceiling to hold the raised position of the armrest. However, the stopper belt passed between the armrest and the ceiling provides bad appearance. Moreover, it is uneasy to use.

SUMMARY OF THE INVENTION

The present invention was completed based on the circumstances as above, and its purpose is to provide a rear console box having a position holding function to hold a raised position of the console box body.

A rear console box in accordance with the present invention is for a vehicle. The vehicle includes a floor, seat rows on the floor, and an aisle between the seat rows. The rear console box is disposed in the aisle. The rear console box includes a console box body, a hinge configured to connect the console box body with respect to the floor and thereby allow the console box body to pivot between a horizontal position and a raised position. The horizontal position is in the aisle and is substantially horizontal relative to the floor. The raised position is outside the aisle and in front of the aisle. The rear console box also includes a support member configured to extend between the console box body and the floor. The support member supports the console box body and thereby holds the raised position of the console box body.

The rear console box in accordance with the present invention can hold the console box body in the raised position. Furthermore, the support member that holds the raised position is disposed between the floor and the console box body. Therefore, when holding the console box body, even if some operation to the support member is necessary, the passenger can perform the operation with sitting in a rear seat. Furthermore, since the support member is mostly hidden, there is few concern of bad appearance.

The console box body may further include a bottom wall and a storage cavity. The storage cavity is defined in the bottom wall. The bottom wall faces the floor when the console box body is in the horizontal position, and the storage cavity is exposed to an outside and thereby is usable when the console box body is in the raised position. With this, small articles can be stored in the console box body even when the console box body is in the raised position, and it is user-friendly.

The rear console box may further include a distal end portion thereof and a lock unit. The lock unit is disposed in the distal end portion. The lock unit is configured to lock the console box body with respect to the floor. The support member includes a cylinder unit having a piston rod. The piston rod is extended and shifts a position so as to lengthen a length thereof.

With this, when the lock by the lock unit is released, the piston rod of the cylinder unit is extended and shift the position so as to lengthen the length thereof and raise the console box body from beneath. As the result, the console box body in the horizontal position is pivoted about the hinge and is raised toward the front of the vehicle. Therefore, in order to raise the console box body toward the front of the body, it is only necessary for the passenger to operate the unlocking operation, while it is unnecessary to operate other operations such as to raise the console box body by hand. Therefore, the it is easy to operate. Furthermore, the console box body can be held in the raised position. It is thus still more user-friendly.

DETAILED DESCRIPTION OF THE PREFERRED EMBODIMENTS

Figure 1:
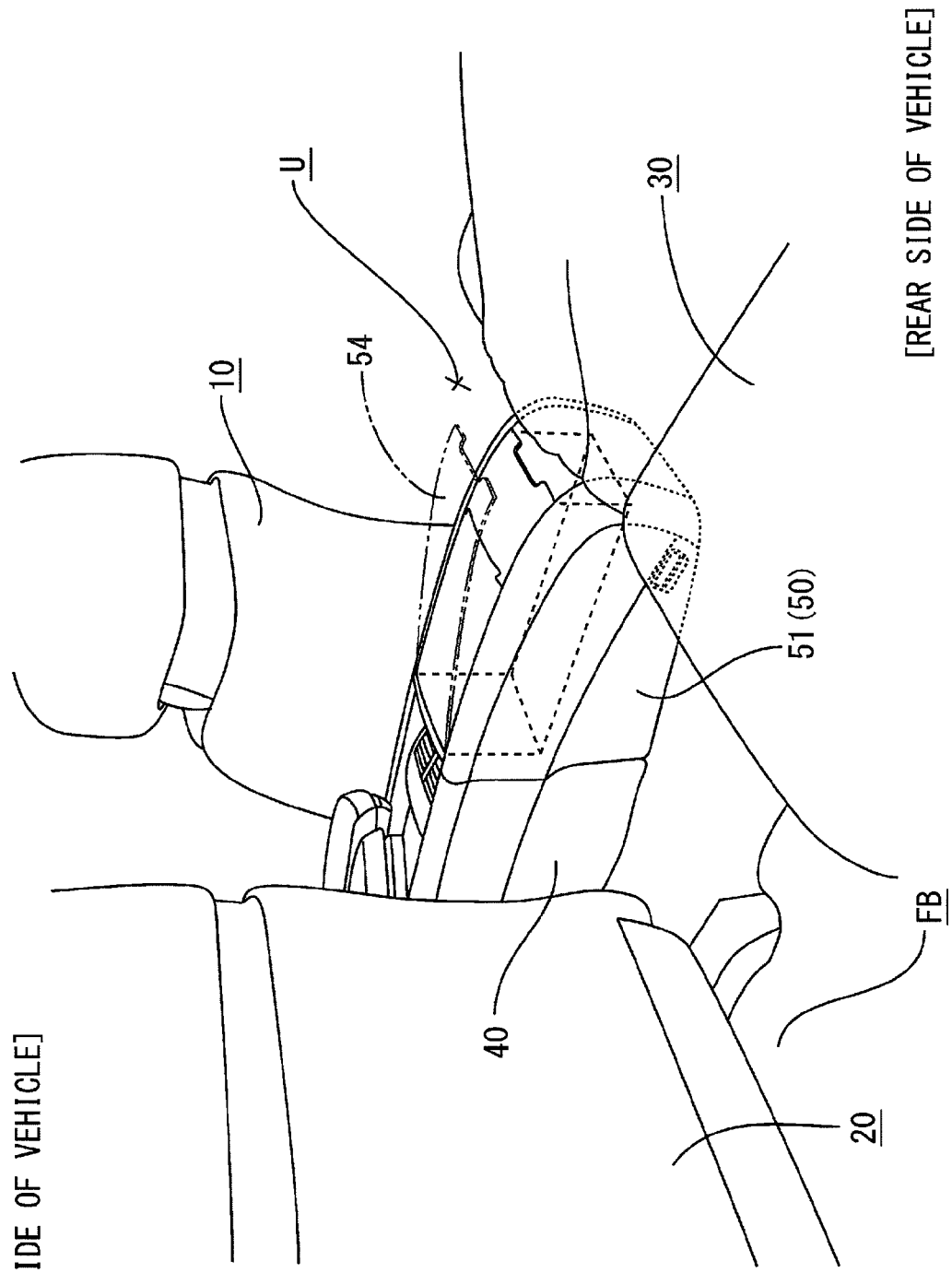
FIG. 1 is a perspective view of an inside of a vehicle of a first embodiment, the inside being viewed from the rear side of the vehicle.

A first embodiment in accordance with the present invention will be explained with reference to FIGS. 1 through 12. Note that the front and the rear hereinafter mean the front and the rear of a vehicle, respectively. FIG. 1 is a perspective view of an inside of the vehicle of the first embodiment, the inside viewed from the rear side of the vehicle. Note that, in FIG. 1, the left far side corresponds to a front side of the vehicle, while the right near side corresponds to a rear side of the vehicle. The vehicle of this embodiment includes a driver seat 10, a front passenger seat 20, and a bench seat 30. The driver seat 10 and the front passenger seat 20 are disposed in a front row in the vehicle with aligned in a widthwise direction of the vehicle. The bench seat is disposed in a rear row in the vehicle.

The vehicle also includes a front console box 40. The front console box 40 is disposed on a floorboard FB and between the driver seat 10 and the front passenger seat 20. The vehicle also includes a rear console box 50. The rear console box 50 is disposed behind the front console box 40. The rear console box 50 is located in an aisle U. The aisle U is provided between the front row seats and the rear row seat.

The rear console box 50 is configured by a console box body 51, connecting members 70, stay dampers 80, and the like. Details of the rear console box 50 will be described below. Note that, in this embodiment, each of the stay dampers 80 is one of illustrations of "a support member" and "a cylinder unit" as claimed.

The console box body 51 is made of synthetic resin and has a generally box shape. The console box body 51 includes a lid 54. The lid 54 can be opened and closed about a hinge (not illustrated) provided at the front end thereof. The top of the console box body 51 thus can be opened as shown in FIG. 1. This allows a passenger to put small articles in the console box body 51 and take them out therefrom.

Figure 2:
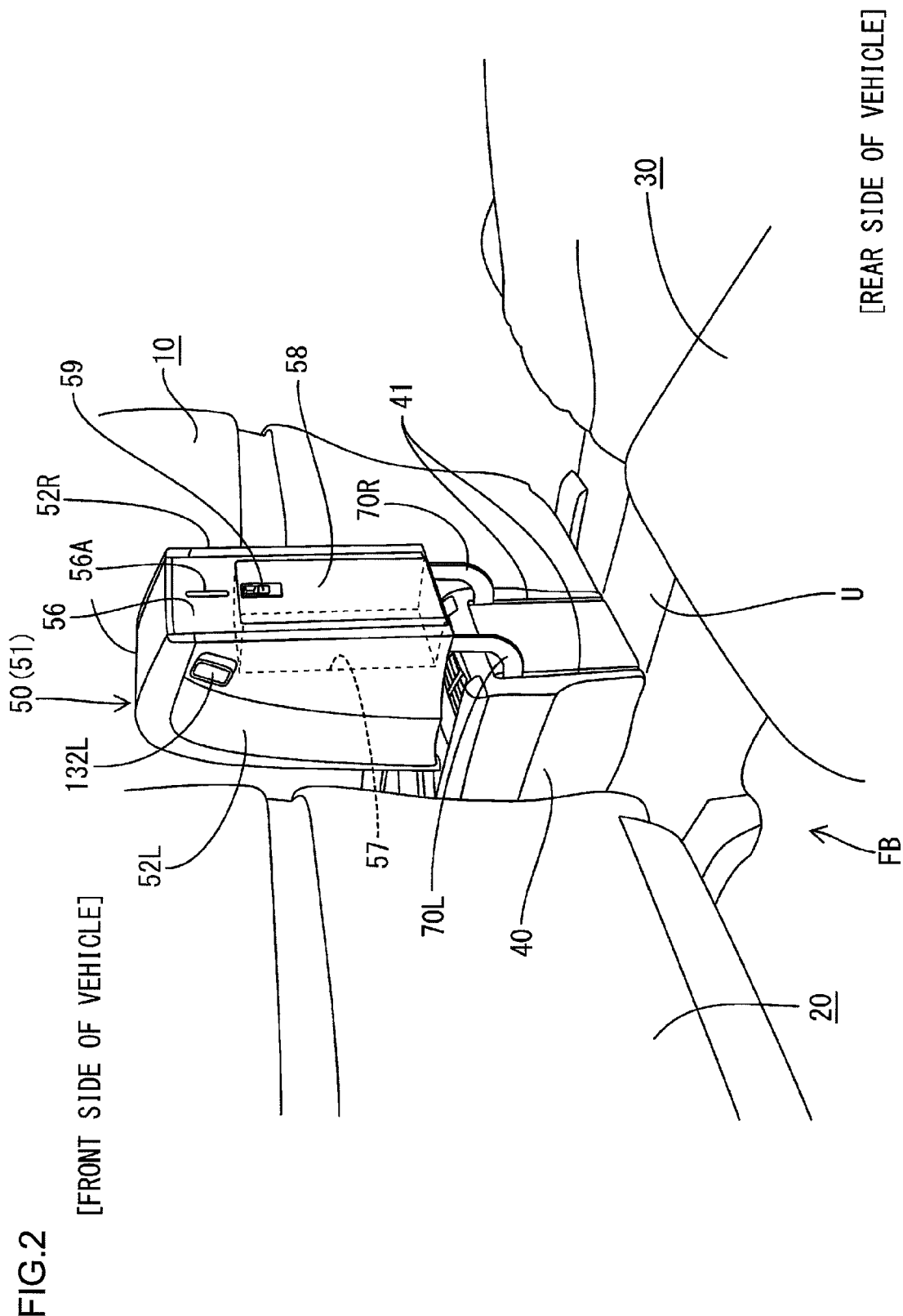
FIG. 2 is a perspective view showing a raised state of a console box body.

FIG. 2 is a perspective view showing a raised state of the console box body 51. The rear console box 50 of this embodiment is configured such that the console box body 51 can be raised from a horizontal position (see FIG. 1), wherein the console box body 51 is horizontally laid in the aisle U, to the upside above the front console box 40 (see FIG. 2). A specific configuration to perform the raising operation for the console box body 51 will be hereinafter explained with reference to FIGS. 3 through 9.

Figure 3:
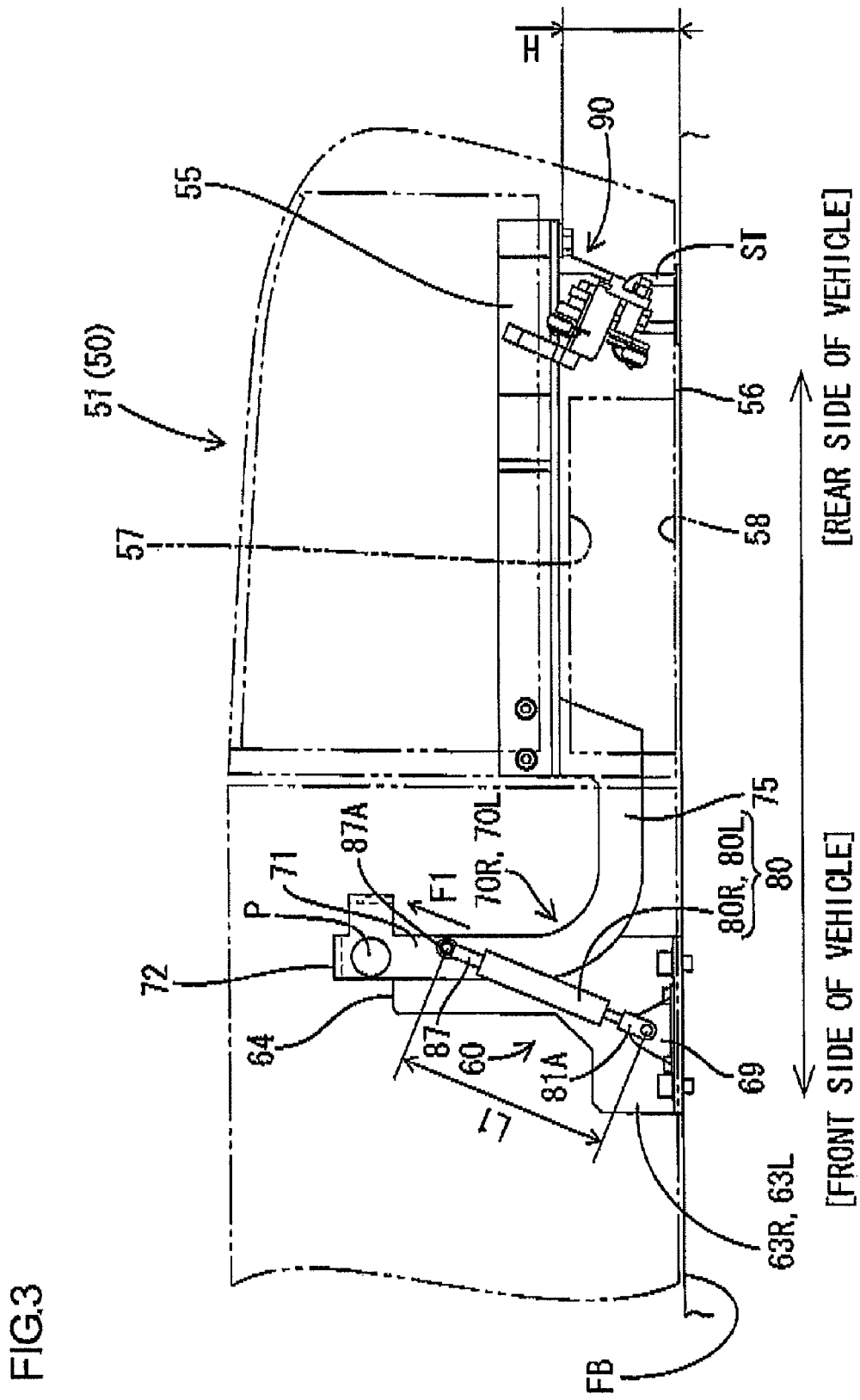
FIG. 3 is a figure showing a support structure of the console box body.
Figure 4:
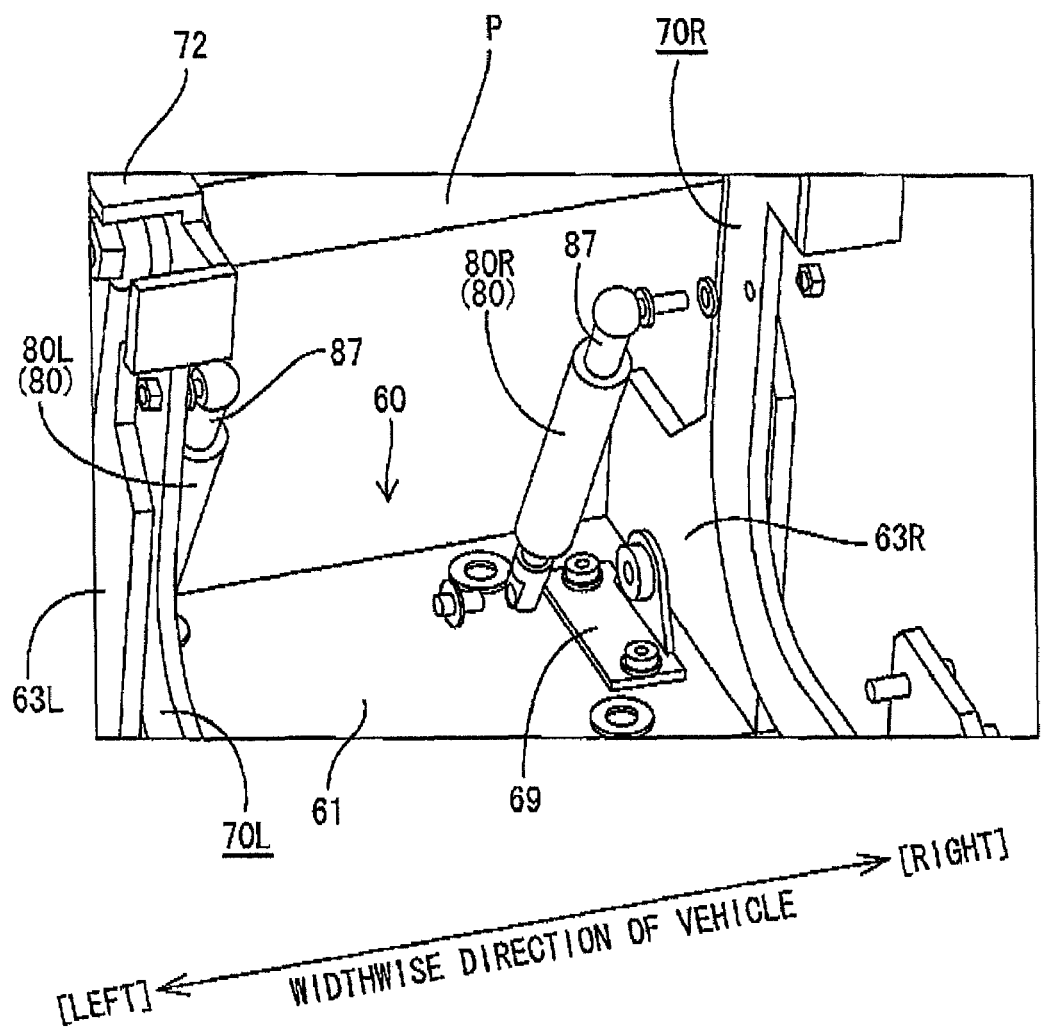
FIG. 4 is a perspective view of an attachment base and its neighboring parts.

FIG. 3 shows a figure showing a support structure of the console box body 51. FIG. 4 is a perspective view showing an attachment base 60 and its neighboring parts. Note that, in FIG. 3, the left side corresponds to the front side of the vehicle, while the right side corresponds to the rear side of the vehicle. The attachment base 60, which is made of metal, is fixed in front of the console box body 51 and on the floorboard FB of the vehicle. The attachment base 60 includes, as shown in FIGS. 3 and 4, a bottom plate 61 and two support walls 63R, 63L. The bottom plate 61 has a flat plate shape. The two support walls 63R, 63L are provided on both sides (both sides in the widthwise direction of the vehicle) of the bottom plate 61. Note that the two sides in the widthwise direction of the vehicle will be hereinafter referred to as the right and the left.

The top end of each of the support walls 63R, 63L is stepped with the rear side thereof extending more upwardly than the front side thereof. The top rear end portions of the support walls 63R and the support wall 63L are bridged by a pipe P attached thereto in the widthwise direction of the vehicle. Note that the pipe P of this embodiment is one of illustrations of "a hinge" as claimed.

a storage cavity 57 and a lock unit 90 are disposed in front and behind of each other in the bottom portion of the console box body 51. The lock unit 90 will be explained below. Disposed above the storage cavity 57 and the lock unit 90 is a metal support frame 55. As shown in FIG. 2, the storage cavity 57 is formed by concaving the center area of a bottom wall 56. The storage cavity 57 has an openable lid 58. The openable lid 58 can be opened and closed about a hinge (not illustrated).

The support frame 55 has a frame shape that is slightly smaller than the size of the console box body 51. The support frame 55 is fixed to the console box body 51. The support frame 55 is thus immovable relative to the console box body 51. The lock unit 90 is fixed to a rear end portion of the support frame 55. Fixed to a front end portion of the support frame 55 are the connecting members 70R, 70L.

Specifically, as shown in FIG. 3, each of the connecting members 70R, 70L includes a first arm 71 and a second arm 75. The first arm 71 and the second arm 75 are perpendicular to each other and form a substantial L shape. A distal end portion of the second arm 75 of the connecting member 70R is fixed to a front right end portion of the support frame 55. A distal end portion of the second arm 75 of the connecting member 70L is fixed to a front left end portion of the support frame 55.

Each of the first arms 71 of the connecting members 70R, 70L has an axial hole (not illustrated) in the distal end portion thereof. The pipe P is inserted in the axial holes, whereby the connecting members 70R, 70L are pivotably attached to the attachment base 60. Thus, in this embodiment, the connecting members 70R, 70L pivotably connect the console box body 51 with the attachment base 60. The console box body 51 thus can be pivoted about the pipe P toward the front side of the vehicle.

Note that, in this embodiment, the distal ends of the first arms 71 of the connecting members 70R, 70L each are bent outwardly to form pivot stoppers 72. With this, when the console box body 51 pivots by about 90 degrees, the pivot stoppers 72 each abut against respective steps 64 of the support walls 60R, 60L to prevent further pivoting movement of the console box body 51 toward the front side of the vehicle.

In addition, as shown in FIG. 3, a striker ST is provided on a location on the floorboard FB. The location faces the lock unit 90. Therefore, by causing the lock unit 90 to lock the striker ST, the console box body 51 can be held in the horizontal position shown in FIGS. 1 and 3. In the state where the lock unit 90 locks the striker ST, each of the first arms of the connecting members 70R, 70L takes an upright position along the vertical direction, while each of the second arms 75 takes a position parallel to the upper surface of the floorboard FB.

Meanwhile, as shown also in FIGS. 3 and 4, stay dampers 80R, 80L are attached between the attachment base 60 and the connecting members 70. The stay dampers 80R, 80L each are provided in the right and in the left with corresponding to the respective right and left connecting members 70R, 70L.

Figure 5:
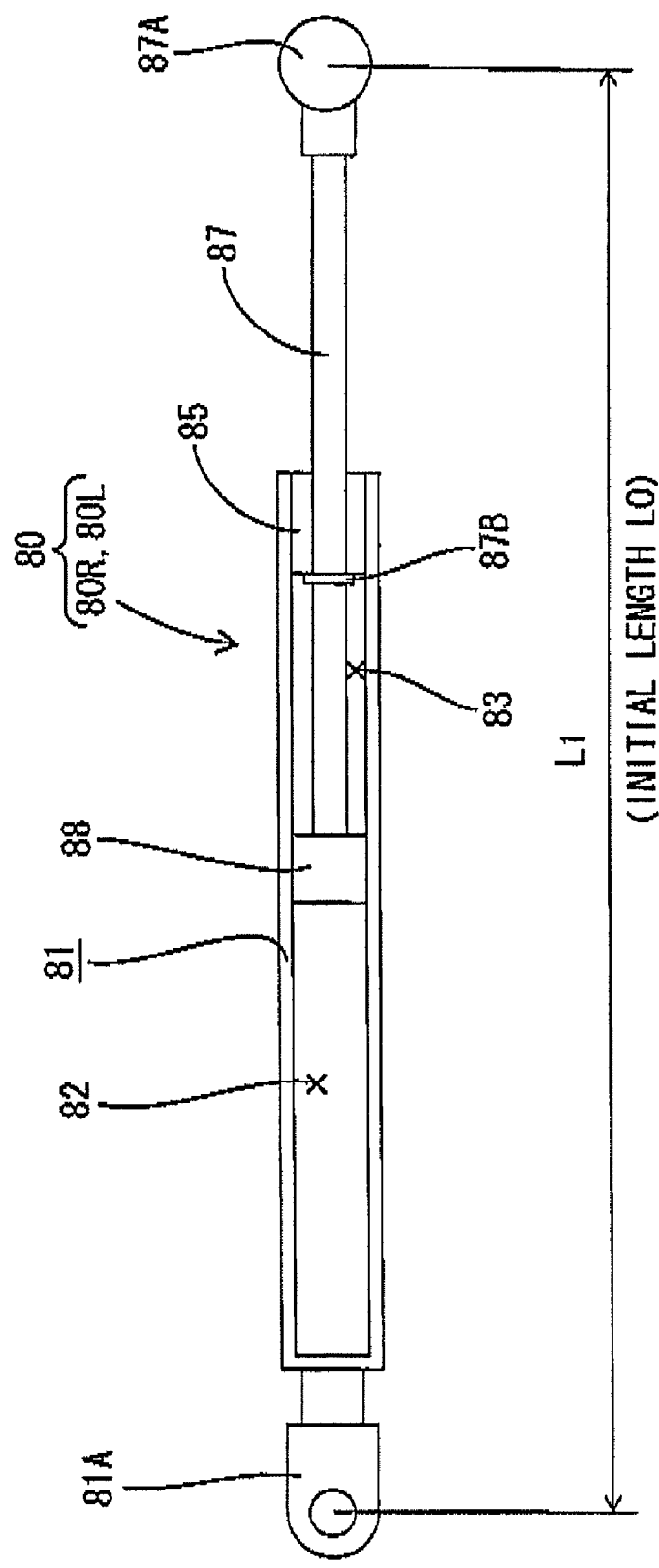
FIG. 5 is a cross-sectional view showing an internal structure of a stay damper.

FIG. 5 is a cross-sectional view showing an internal structure of each of the stay dampers 80R, 80L. As shown in FIG. 5, the each of the stay dampers 80R, 80L includes mainly a tubular cylinder 81 and a piston rod 87. The cylinder 81 has a bottom, an opening, and a seal member 85. The seal member 85 is inserted in the opening. The opening allows the piston rod 87 to move therein and thereout through the seal member 85. The inside of the cylinder 81 is hermetically sealed. The inside of the cylinder 81 is partitioned by a piston 88 into a first gas chamber 82 and a second gas chamber 83. Both of the chambers 82, 83 includes pressurized gas sealed therein.

The stay damper 80 is set such that the pressure in the first gas chamber 82 is always higher than the pressure in the second gas chamber 83 regardless of position of the piston rod 87. That is, when the stopper 87B abuts against the seal member 85 (the state shown in FIG. 5), the piston rod 87 is in a most extended state (an initial state); in the initial state, the gas pressures are set so that the pressure in the first gas chamber 82 is higher than the pressure in the second gas chamber 83. With this configuration, urging force in the direction extending the piston rod 87 is always exerted to the piston rod 87.

An oil passage (not illustrated) wherethrough oil is circulated is formed in each of the stay dampers 80R, 80L. When the piston rod 87 moves along the longitudinal direction (the right and left direction in FIG. 5) of the cylinder 81, oil is circulated through the oil passage. With this configuration, the forces exerts to the piston rod 87 are moderately damped by viscous resistance of the oil. The piston rod 87 thus can smoothly move.

Brackets 69 are fixed to the attachment base 60. A distal portion 81A on the cylinder side of each of the stay dampers 80R, 80L is clamped on respective one of the brackets 69. On the other hand, a distal portion 87A on the rod side of each of the stay dampers 80R, 80L is clamped on respective one of the first arm 71 at a position near the pipe P. In the locked state by the lock unit 90 shown in FIG. 3, each of the stay dampers 80R, 80L takes an inclined position below the pipe P. In the inclined position, the axis of the each of the stay damper 80R, 80L is inclined by a predetermined angle in the rearward direction of the vehicle.

In the locked state as above, an interval L1 between the two clamped points on the bracket 69 side and the first arm 71 side of each of the stay dampers 80 is shorter than a full length L0 of the stay damper 80 in the initial state (a natural state before attachment). Therefore, the piston rod 87 of each of the stay dampers 80R, 80L comes to a slid down state, and repulsive force F1 in a returning direction (the extending direction) comes to be exerted to each of the piston rods 87. Note that the repulsive force F1 is generated by the difference of the pressures in the two gas chambers 82, 83.

In this embodiment, the magnitude of the repulsive force F1 is set to a larger magnitude to some degree, i.e. is set to a value enough to cause the console box body 51 to pivot when the repulsive force F1 is converted into force of moment about the pipe P.

In addition, in this embodiment, the attachment base 60 and the stay dampers 80 are enclosed in the front console box 40, so that these members 60, 80 are not exposed to the outside. Note that two slits 41 are formed by vertically opening the rear end wall of the front console box 40, and the connecting members 70R, 70L each protrude through the respective slits 41 to the console box body 51 side (see FIG. 2).

The lock unit 90 and an unlock operating unit 100 will be hereinafter be explained.

Figure 6:
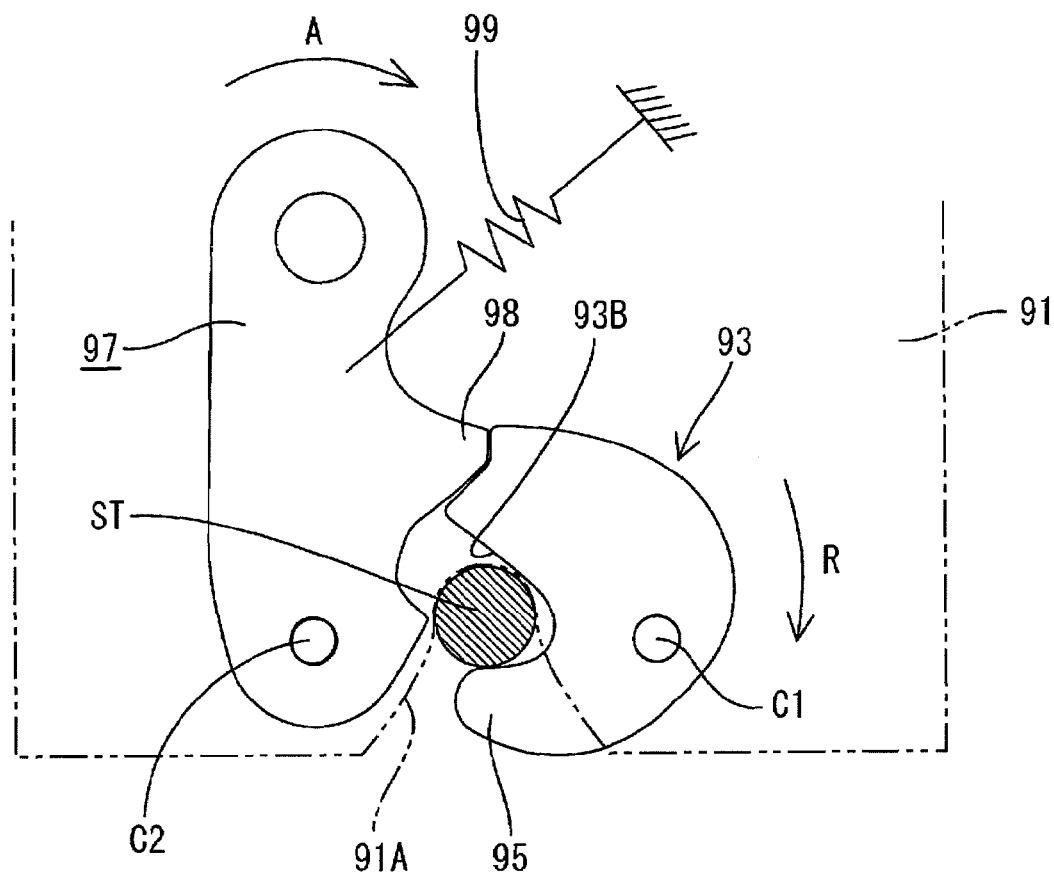
FIG. 6 is a figure showing a structure of a lock unit (showing a locked state)

FIG. 6 is a figure showing a structure of the lock unit 90. The lock unit 90 includes a lock plate 91, a latch 93, and a pole 97. The lock plate 91 includes a locking notch 91A formed therein. The locking notch 91A opens downwardly in FIG. 6. The latch 93 and the pole 97 are disposed on the sides opposite from each other across the locking notch 91A. That is, the latch 93 is disposed on the right side in FIG. 6 of the lock plate 91. The latch 93 is rotatable about an axis C1. The pole 97 is disposed on the left side in FIG. 6 of the lock plate 91. The pole 97 is rotatable about an axis C2.

The latch 93 has a flat plate shape. A locking claw 95 is formed on a part of the outer periphery of the latch 93. When the latch 93 is in a locking position as shown in FIG. 6, the locking claw 95 closes the locking notch 91A while locking the striker ST.

Similar to the latch 93, the pole 97 has a flat plate shape. A protrusion 98 is formed on a part of the outer periphery of the pole 97. A lock spring 99 is hooked to the free end portion of the pole 97. The lock spring 99 exerts urging force to the pole 97 in the direction "A" in FIG. 6.

When the latch 93 is in the locking position, this urging force causes the protrusion 98 of the pole 97 to abut against, and thereby push, the latch 93 in the locking direction (the direction "R" shown in FIG. 6). As the result, the lock of the striker ST by the latch 93 is held. From the above, when the lock unit 90 causes the lock, the console box body 51 is held in the horizontal position shown in FIGS. 1 and 3.

Note that the lock unit 90 is entirely enclosed in the console box body 51, and is not exposed to the outside. On the other hand, a receiving slit 56A is provided in the console box body 51 at a location that faces the locking notch 91A (see FIG. 2). Therefore, the striker ST is allowed to enter the inside of the console box body 51 through the receiving slit 56A and be locked by the lock unit 90 in the box without any interference.

Figure 7:
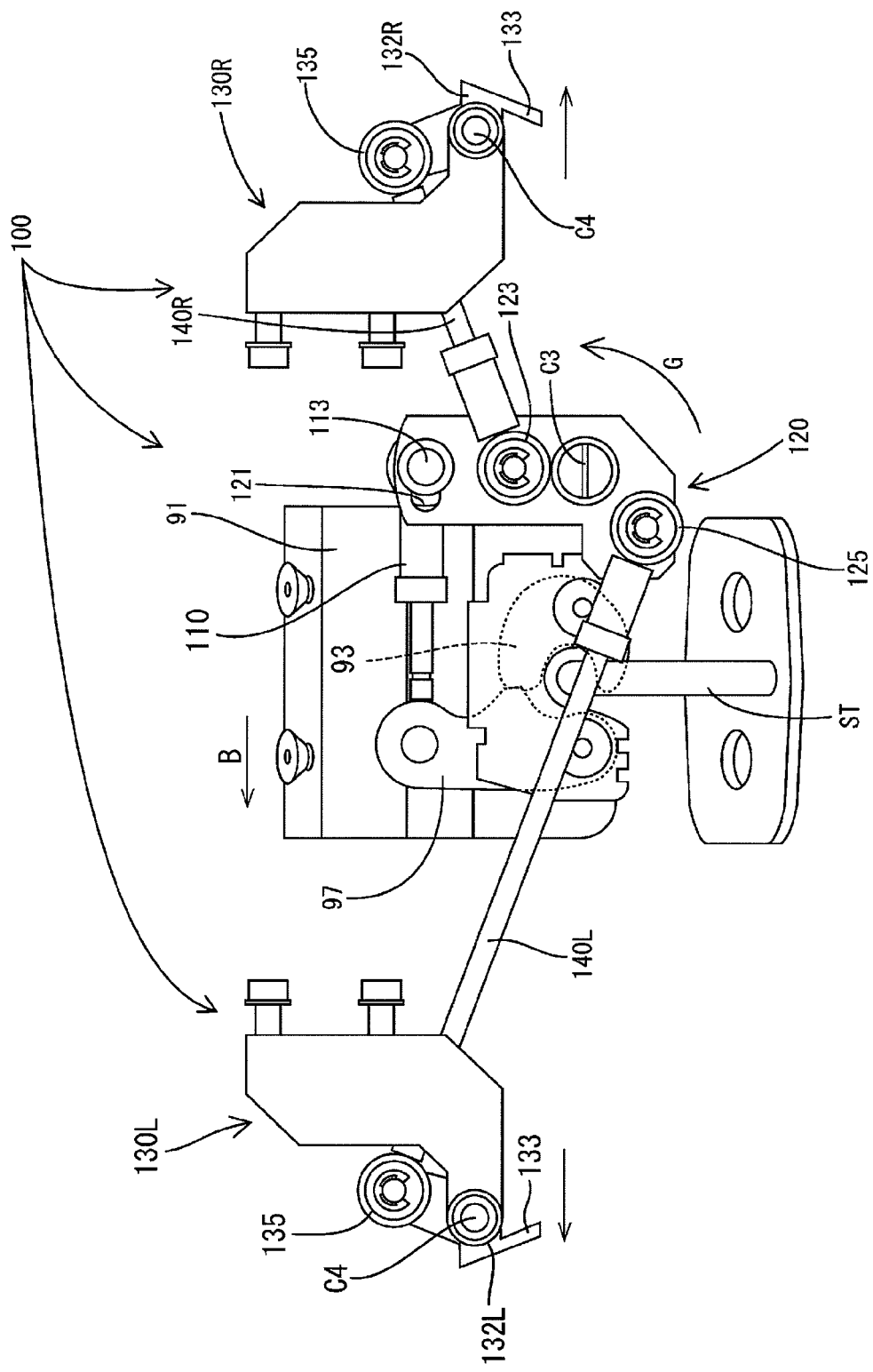
FIG. 7 is a figure showing a structure of an unlock operating unit (showing a state before unlocking)
Figure 8:
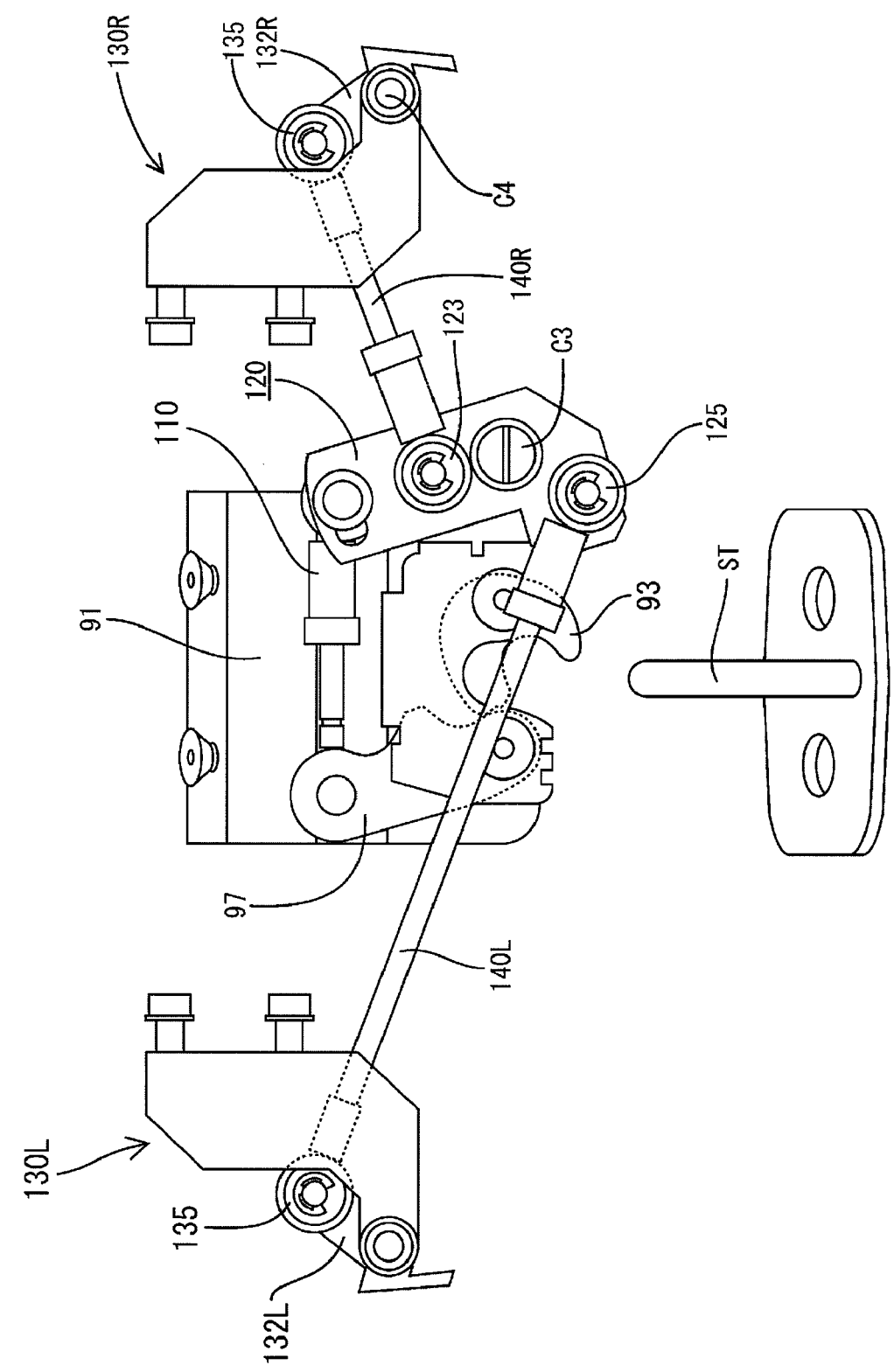
FIG. 8 is a figure showing the structure of the unlock operating unit (showing an unlocking state)

The unlock operating unit 100 will be hereinafter explained. FIGS. 7 and 8 are figures showing a structure of the unlock operating unit 100. FIG. 7 shows a state before unlocking, and FIG. 8 shows an unlocking state.

The unlock operating unit 100 is arranged to release the lock between unit 90 and the striker ST. Similar to the lock unit 90, the unlock operating unit 100 is enclosed in the console box body 51. The unlock operating unit 100 includes a push pin 110, a link member 120, and two lever units 130R, 130L.

The push pin 110 is arranged to push the pole 97 in a lock releasing direction (the direction "B" shown in FIG. 7). As shown in FIG. 7, the push pin 110 is disposed laterally with directing the axis thereof horizontally. A distal end of the push pin 110 faces the free end portion of the pole 97 with a slight clearance therebetween. A basal end of the push pin 110 has an engaging portion 113.

The link member 120 is made of metal and has a substantial L shape. As shown in FIG. 7, the link member 120 is disposed to the right of the latch 93 so as to be pivotable about an axis C3. The link member 120 has a guide hole 121 formed in a front end portion thereof. The push pin 110 as above has an engaging portion 113 provided in the rear end portion thereof. The engaging portion 113 is inserted in the guide hole 121.

The link member 120 has a first link pin 123 and a second link pin 125. The first pin 123 and the second link pin 125 are located in opposite sides from each other across the axis C3 (over and below the axis C3 in FIG. 7).

The lever units 130R, 130L are disposed to the right and to the left of the lock plate 91, respectively, in FIG. 7. The shapes of the two lever units 130R, 130L are symmetric to each other. The lever units 130R, 130L have operation levers 132R, 132L, respectively. Each of the operation levers 132R, 132L are pivotable about a hinge C4. As shown in FIG. 2, these operation levers 132R, 132L protrude to the right wall 52R and to the left wall 62L, respectively. The operation levers 132R, 132L can be operated outside the console box body 51.

Returning to FIG. 7, each of the operation levers 132R, 132L has a push portion 135 integrally formed therewith. The push portion 135 of the right operation lever 132R in FIG. 7 and the first link pin 123 are bridged by a first rod 140R disposed therebetween. The push portion 135 of the left operation lever in FIG. 7 and the second link pin 125 are bridged by a second rod 140L disposed therebetween.

From the above, when a lever end 133 of either one of the right and left operation levers 132R, 132L is pulled outwardly (or when lever ends 133 of both of the right and left operation levers 132R, 132L are pulled outwardly), the link member 120 is rotated about the axis C3 in a direction of arrow G shown in FIG. 7. Then, the push pin 110 is slid toward the pole 97 (toward the left in FIG. 7) and thereby pushes the pole 97 in the unlocking direction (see FIG. 8). As the result, the push of the pole 97 against the latch 93 is cancelled, and the lock of the striker ST by the lock unit 90 comes to an unlockable state.

Figure 9:
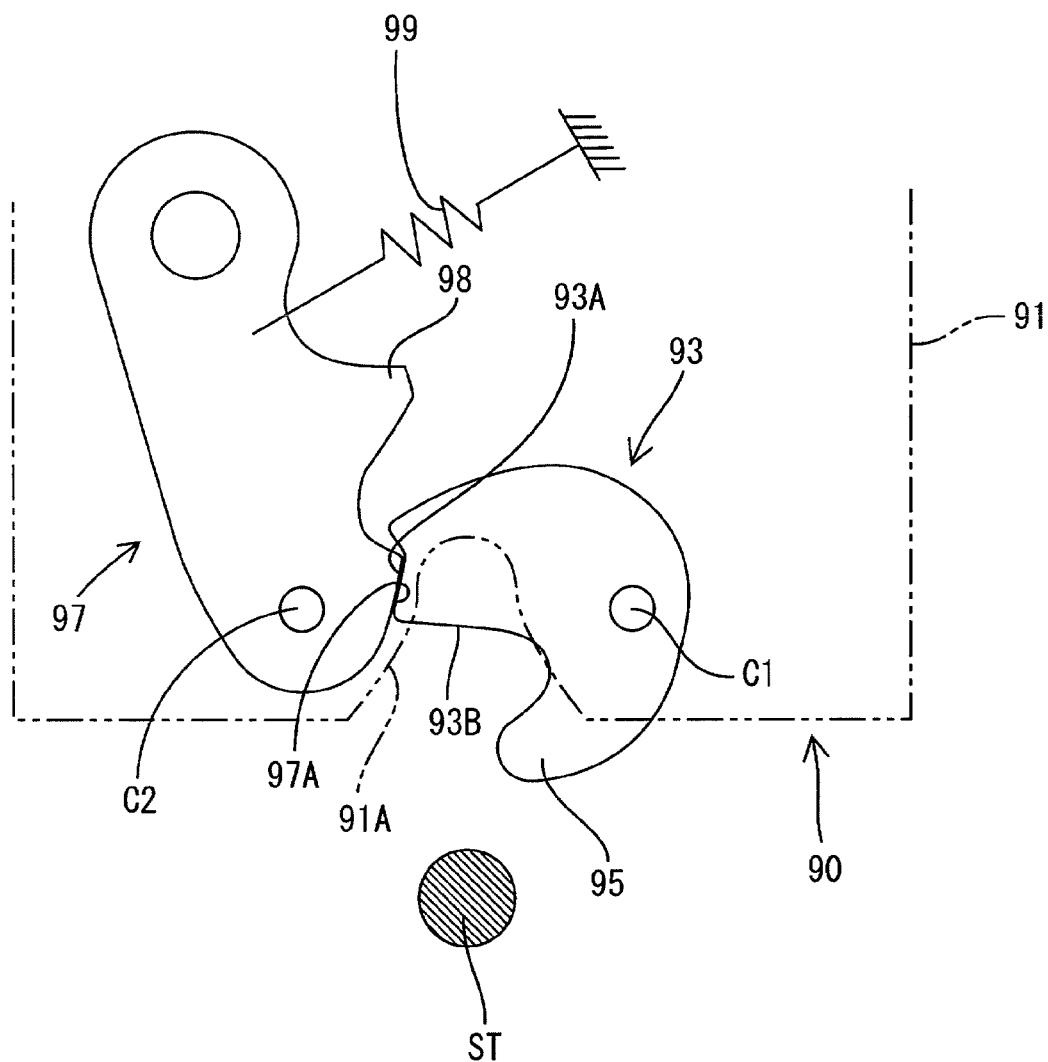
FIG. 9 is a figure showing the structure of the lock unit (showing an unlocked state)

FIG. 9 is a figure showing the lock unit 90 in an unlocked state. In this embodiment, when the latch 93 is rotated by a predetermined angle in the unlocking direction, an edge 93A of the outer periphery of the latch 93 is engaged with an edge 97A of the outer periphery of the pole 97 and thereby comes to a balanced state as shown in FIG. 9. The latch 93 and the pole 97 thus come to rest each in the positions.

In the balanced state, the locking claw 95 of the latch 93 is drawn away to the right end of the lock groove 91A to release the lock notch 91A. From the above, by forcing the striker ST into the lock notch 91A again, the striker ST can be locked again by the lock unit 90.

Next, operation of the console box body 51 after unlocking will be explained. First, during the lock by the lock unit 90, the piston rods 87 of the stay dampers 80R, 80L are in the slid down state with the lengths L shortened.

Therefore, once the lock by the lock unit 90 is released, each of the piston rods 87 tends to be extended and shift the position so that the length L is lengthen. This causes the connecting members 70R, 70L to be pushed obliquely upward (in the direction of the repulsive force F1 shown in FIG. 3) by the piston rods 87.

Furthermore, in this embodiment, the magnitude of the repulsive force F1, which is exerted to the connecting members 70R, 70L by the piston rods 87 of the stay dampers 80R, 80L during unlocking, is set to a larger magnitude to some degree enough to cause the console box body 51 to pivot.

From the above, after unlocking, the connecting members 70R, 70L, and consequently the console box body 51, start to pivot automatically about the pipe P toward the front of the vehicle.

Figure 10:
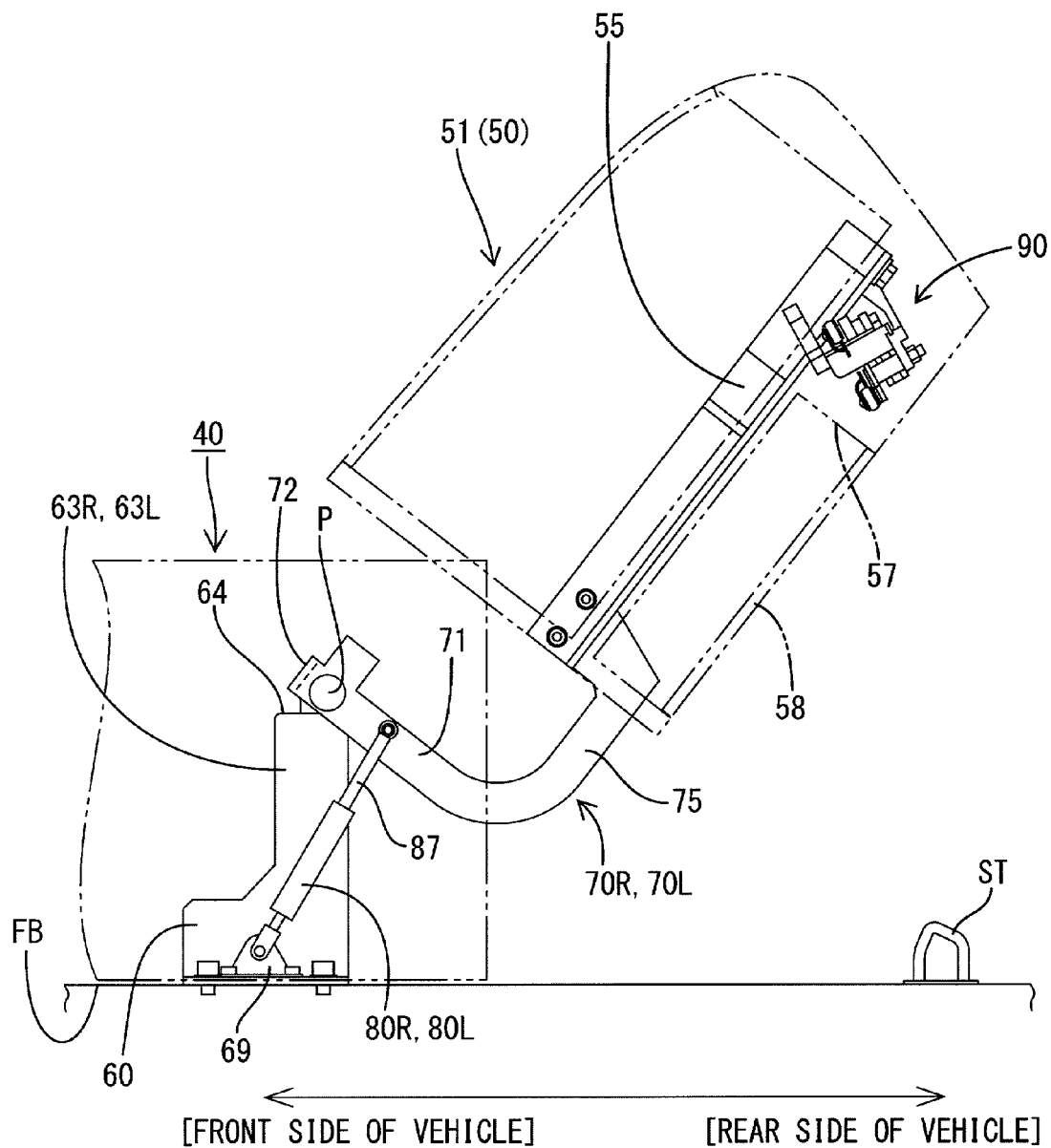
FIG. 10 is a figure showing a process of raising operation for the console box body.
Figure 11:
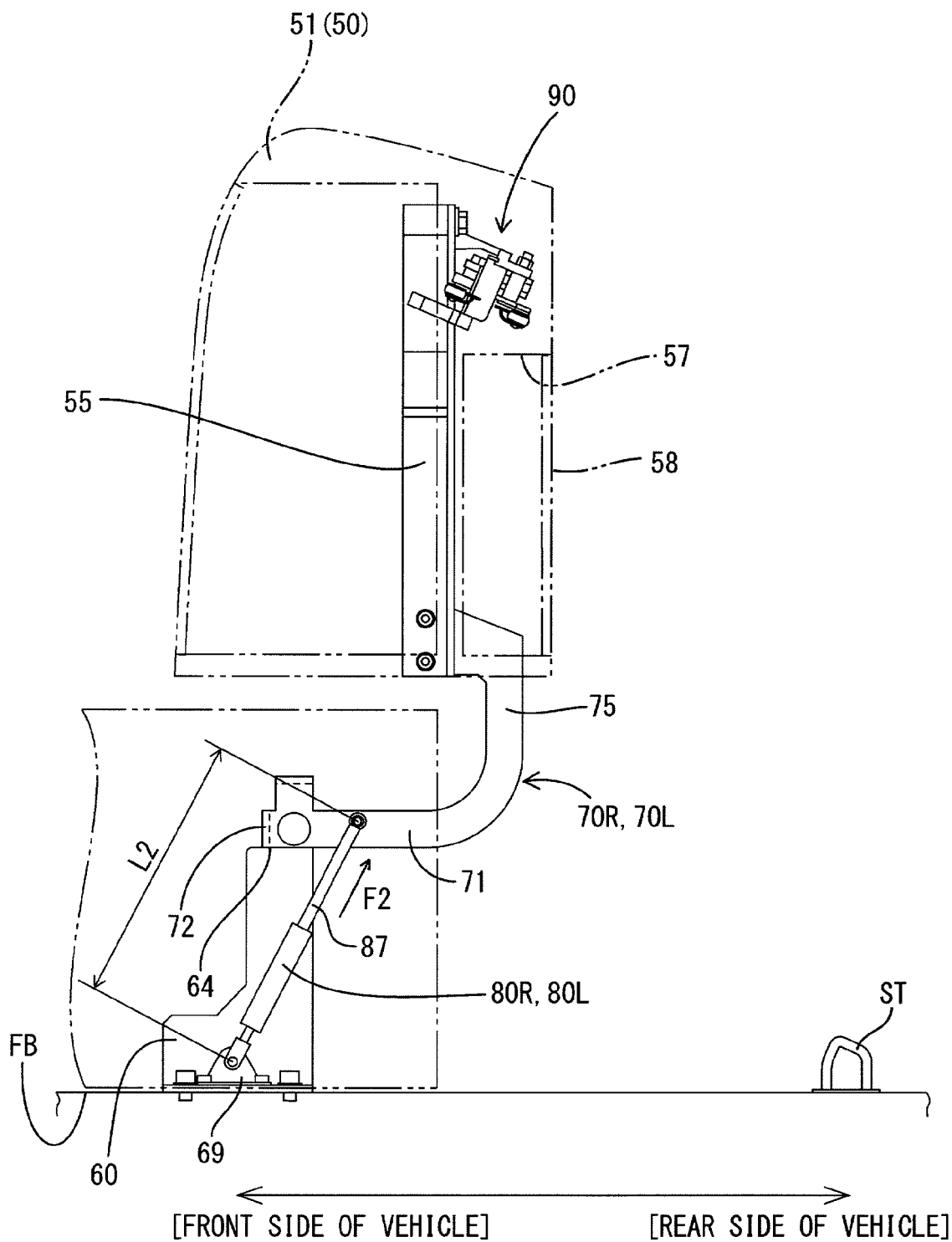
FIG. 11 is a figure showing a raised state of the console box body.

FIG. 10 is a figure showing a process of the raising operation for the console box body 51. FIG. 11 is a figure showing the raised state of the console box body 51. Note that, in FIGS. 10 and 11, the left side corresponds to the front side of the vehicle, while the right side corresponds to the rear side of the vehicle. As the console box body 51 starts to pivot toward the front of the vehicle, each of the stay dampers 80, following the pivot, while pivoting about the clamped point on the bracket 69 side, further lengthens, and shift the position of, the piston rods 87 (see FIG. 10).

With this, the console box body 51 further continues to pivot toward the front of the vehicle. Finally, when the pivot angle has come to about 90 degrees, the pivot stoppers 72 of the connecting members 70R, 70L abut against the steps 64 provided on the upper end faces of the support walls 63R, 63L, and comes to a state restricted in further pivot action. In this state, as shown in FIG. 11, the entire console box body 51 is in the raised state raised to the upside above the front console box 40.

Then, in this state, the interval between the two clamped points of the bracket 69 side and the first arm 71 side of each of the stay dampers 80 becomes L2 as shown in FIG. 11. The interval L2 is longer than the earlier interval L1, however, is shorter than the full length L0 in the initial state of the stay damper 80. Accordingly, also in the state after pivot shown in FIG. 11, the piston rod 87 is in the slid down state.

Therefore, also after raising, the constant repulsive force F2 is exerted from the piston rods 87 of the stay dampers 80R, 80L to the connecting members 70R, 70L. As the result, the stay dampers 80R, 80L come to the state supporting the console box body 51 from beneath, and restricts the console box body 51 in returning by its own weight to the original horizontal position.

In this manner, the raised console box body 51 is restricted in frontward pivot by the pivot stoppers 72 and is supported from beneath by the stay dampers 80R, 80L bridging the floorboard FB and the connecting members 70R, 70L. This causes the console box body 51 to be held in the raised position (a position holding function) as shown in FIGS. 2 and 11.

Figure 12:
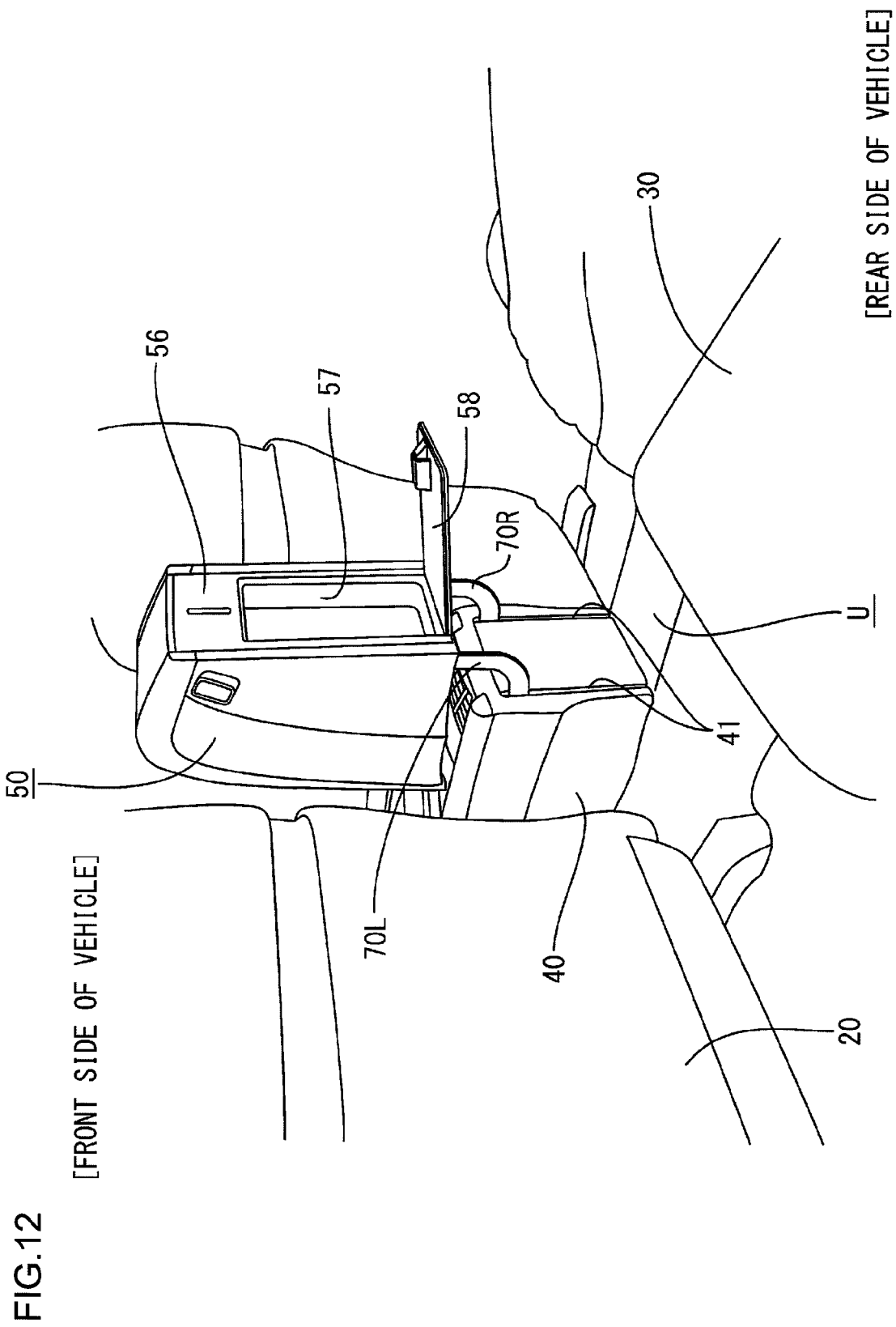
FIG. 12 is a perspective view of the console box body showing a state with a store cavity opened.

FIG. 12 is a perspective view of the console box body 51 showing a state with the store cavity 57 opened. The storage cavity 57 is formed in the bottom wall 56 of the console box body 51. When the console box body 51 is raised, the storage cavity 57 is located in front in view of the rear seat passenger as shown in FIG. 2.

Consequently, by opening the openable lid 58 along with operating a lever 59 in the upper portion of the lid, the console box body 51 can be used as a space for small articles.

Note that, in order to return the console box body 51 from the state shown in FIG. 12 to the state of the horizontal position shown in FIG. 1, it is only necessary to close and lock up the openable lid 58 and then to push the rear end portion of the console box body 51 downwardly with resisting the urging force of the stay dampers 80R, 80L. When the console box body 51 is returned to the horizontal position shown in FIG. 1 by the push, the striker ST is locked by the lock unit 90 of the console box body 51. Thus, after locked, the console box body 51 is held in the horizontal position shown in FIG. 1 without being held by hand.

Next, effects of this embodiment will be explained.

The rear console box 50 of this embodiment is configured such that the console box body 51 can be raised to the front side of the vehicle. With this configuration, as shown in FIG. 2, the aisle U that is located between the front row and the rear row can be opened through entire width of the vehicle. This allows the passenger to easily move in the aisle U and, even in a case where a door on one side is blocked up, the passenger can easily board and leave from a door on another side. Furthermore, the aisle U can be used as a space for placing baggage, and the internal space can be effectively utilized.

Furthermore, in order to raise the console box body 51, it is only necessary to unlock the lock unit 90. Then, after unlocking, each of the piston rods 87 of the stay dampers 80R, 80L is extended and shifts the position to lengthen the length L and thereby raise the console box body 51 from beneath. As the result, the console box body 51 is pivoted about the pipe P and is automatically raised toward the front of the vehicle.

Thus, with this embodiment, in order to raise the console box body 51 toward the front of the vehicle, it is only necessary for the passenger to operate the lock releasing operation. That is, operation such as to raise the console box body 51 by hand is unnecessary. Therefore, the rear console box is easy to operate and user-friendly.

Furthermore, in known configurations (known art), in order to hold a position of a raised member, a belt is bridged between a ceiling and the raised member. Unlike this, with the configurations of this embodiment, the stay dampers 80 hold the console box body 51 in the raised position. Therefore, it is unnecessary to operate the bridging operation for the belt between the ceiling and the raised member as in the known art, and the rear console box is user-friendly.

Furthermore, since the stay dampers 80R, 80L are provided in both sides of the right and left of the console box body 51, the raised position can be stably held.

Furthermore, in this embodiment, the operation lever 132R, 132L are provided in both sides of the console box body 51, which allows the passenger to operate the releasing operation of the lock unit 90 from either side. Therefore, the console box is easy to operate.

Furthermore, in this embodiment, the attachment base 60 and the stay dampers 80 are disposed inside the front console box 40 so that they are invisible from the outside. Therefore, the appearance is not disfeatured. This is also one of the effects.

Figure 13:
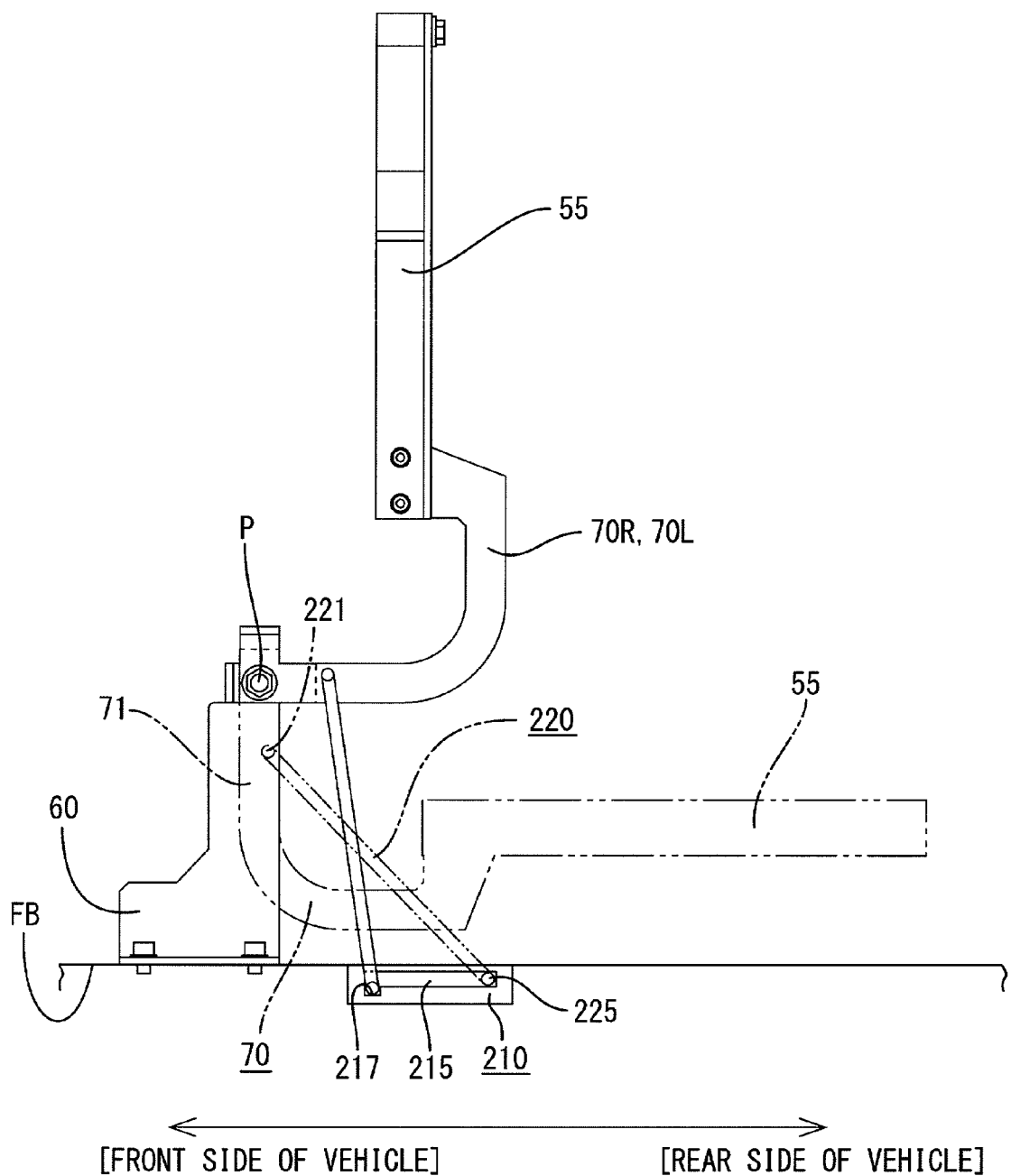
FIG. 13 is a figure showing a holding structure (a holding structure to hold the console box body in the raised position) of a second embodiment.

FIG. 13 is a figure showing a holding structure of a second embodiment.

The first embodiment is configured to hold the raised position of the console box body 51 with the stay dampers 80. On the other hand, the second embodiment is configured to hold the raised position of the console box body 51 with support rods 220. The support rods 220 and slide bases 210 are provided in this embodiment.

Each of the slide bases 210 has an block shape elongated in one direction. The slide base 210 is fixed to the floorboard FB. The slide base 210 has a guide groove 215 formed therein. The guide groove 215 extends in the lengthwise direction of the vehicle. In addition, a lock concavity 217 is formed in an end portion of the guide groove 215 with downwardly concaving a groove face.

Each of the support rods 220 has a stick shape elongated in one direction. An end portion 221 of the support rod 220 is clamped on the first arm 71 of one of the connecting members 70, and another end portion 225 is mated in the guide groove 215.

When the console box body 51 is in the horizontal position (the state shown by chain double-dashed line in FIG. 13), the support rods 220 are in a state where the end portions 225 thereof are located in start end portions of respective one of the guide grooves 215.

In this state, as the passenger raises the console box body 51 from the horizontal position toward the front of the vehicle, the end portions 225 inserted in the respective guide grooves 215 of the support rods 220 are slid toward the front of the vehicle.

Then, when the console box body 51 pivots by about 90 degrees and reaches the raised state (the raised position) shown by solid line in FIG. 13, the end portions 225 of the support rods 220 fall in the respective lock concavities 217 and thereby comes to a state immovable from the location.

Thus, the console box body 51 and the floorboard FB come to a state where the support rods 220 extends therebetween, and the support rods 220 supports the console box body 51 from beneath. As the result, the console box body 51 comes to be held in the raised position.

Note that the stay dampers 80 used in the first embodiment are omitted in this embodiment. Therefore, it is necessary for the passenger to raise the console box body 51 from the horizontal position by his or her own hand. In addition, since the support rods 220 of this embodiment can function also as stoppers to restrict the pivot angle of the console box body 51, the pivot stoppers 72 of the first embodiment also may be omitted. Note that, in the configuration of this embodiment, since the stay dampers 80 are omitted, the lock unit 90 and the striker ST are also omitted accordingly.

Other Embodiments

The present invention is not limited to the description with reference to the drawings. For example, embodiments as follows are also included within the scope of the present invention.

Figure 14:
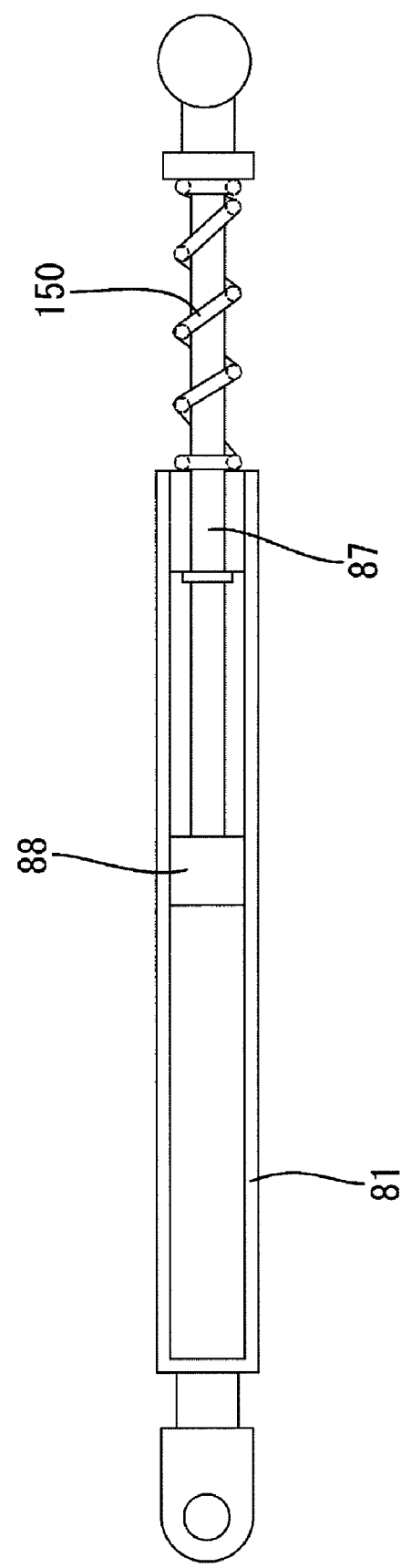
FIG. 14 is a figure showing a modified illustration of a cylinder unit.

(1) FIG. 14 is a figure showing a modified illustration of a cylinder unit. The cylinder unit of the first embodiment is configured to exert the force to each of the piston rods 87 in the direction lengthening the length L by using the gas pressure of the pressurized gas sealed in the cylinder (more in details, the pressure difference between the first gas chamber 82 and the second gas chamber 83). Instead of this configuration, for example as shown in FIG. 14, it may be configured to fit a coil spring 150 around the outer periphery of each of the piston rod 87 and to exert the force to the piston rod 87 in the direction lengthening the length L by using repulsive force of the coil spring 150.

(2) In the first embodiment, as the mechanism to hold the console box body 51 in the horizontal position, the striker ST and the lock unit 90 are used. Other than this, the console box body 51 may be held in the horizontal position by using, for example, magnetic attractive force.

The invention claimed is:

1. A rear console box for a vehicle, the vehicle including a floor, front and rear seat rows on the floor, and an aisle between the front and rear seat rows, the rear console box being disposed in the aisle, the rear console box comprising:

a console box body;

a hinge configured to connect the console box body with respect to the floor and to allow the console box body to pivot between a horizontal position and a raised position, the horizontal position defining the console box body in the aisle and being substantially horizontal relative to the floor, the raised position defining the console box body outside the aisle and in front of the aisle relative to the rear seat row; and a support member configured to extend between the console box body and the floor, wherein the support member supports the console box body and holds the console box body in the raised position so as to provide clearance in the aisle along the entire width of the vehicle.

2. The rear console box according to claim 1, wherein the console box body further includes a bottom wall and a storage cavity, the storage cavity being defined in the bottom wall, wherein the bottom wall faces the floor when the console box body is in the horizontal position, and the storage cavity is disposed in the bottom wall such that when the console box body is in the raised position the storage cavity is accessible to a rear seat passenger.

3. The rear console box according to claim 1, wherein the console box body further includes a distal end portion thereof and a lock unit, the lock unit being disposed in the distal end portion, wherein the lock unit is configured to lock the console box body with respect to the floor, the support member including a cylinder unit having a piston rod, wherein the piston rod is extended and shifts a position so as to lengthen a length thereof.

* * * * *